United States Patent
Horie et al.

(10) Patent No.: US 10,665,825 B2
(45) Date of Patent: May 26, 2020

(54) SURFACE-TREATED STEEL SHEET FOR BATTERY CONTAINERS, BATTERY CONTAINER, AND BATTERY

(71) Applicant: TOYO KOHAN CO., LTD., Tokyo (JP)

(72) Inventors: Shinichirou Horie, Kudamatsu (JP); Tatsuo Tomomori, Kudamatsu (JP); Koh Yoshioka, Kudamatsu (JP)

(73) Assignee: Toyo Kohan Co., Ltd., Tokyo (JP)

( * ) Notice: Subject to any disclaimer, the term of this patent is extended or adjusted under 35 U.S.C. 154(b) by 41 days.

(21) Appl. No.: 15/876,894

(22) Filed: Jan. 22, 2018

(65) Prior Publication Data

US 2018/0145286 A1    May 24, 2018

Related U.S. Application Data

(60) Division of application No. 14/627,902, filed on Feb. 20, 2015, now Pat. No. 9,911,948, which is a
(Continued)

(30) Foreign Application Priority Data

Aug. 29, 2012 (JP) ................ 2012-188513

(51) Int. Cl.
*H01M 2/02* (2006.01)
*C23C 10/28* (2006.01)
(Continued)

(52) U.S. Cl.
CPC ........... *H01M 2/0287* (2013.01); *C23C 10/28* (2013.01); *C23F 17/00* (2013.01); *C25D 5/50* (2013.01);
(Continued)

(58) Field of Classification Search
CPC .......................... H01M 2/0295; H01M 2/0287
See application file for complete search history.

(56) References Cited

U.S. PATENT DOCUMENTS

2009/0311595 A1* 12/2009 Mori .................... B32B 15/015
429/174
2012/0009464 A1    1/2012 Nakazawa et al.

FOREIGN PATENT DOCUMENTS

| EP | 2441532 A1 | 4/2012 |
| JP | 11-204146 A | 7/1999 |

(Continued)

OTHER PUBLICATIONS

Japanese Office Action in application No. 2012-188513 dated Feb. 23, 2016 p. 1-4.
(Continued)

*Primary Examiner* — Olatunji A Godo
(74) *Attorney, Agent, or Firm* — Muncy, Geissler, Olds & Lowe, P.C.

(57) ABSTRACT

A surface-treated steel sheet for battery containers is provided. The surface-treated sheet is used to form a battery container for a battery. The battery uses a nonaqueous electrolytic solution as an electrolytic solution. The surface-treated steel sheet includes a base material made of steel and an iron-nickel diffusion layer formed by performing thermal diffusion treatment after forming a nickel plating layer at least on a surface of the base material to be located at the inner surface side of the battery container. The iron-nickel diffusion layer has an outermost layer of which a ratio of Ni and Fe is 7.5 or less as a molar ratio of Ni/Fe. The iron-nickel diffusion layer has a thickness of 0.6 μm or more.

9 Claims, 4 Drawing Sheets

Related U.S. Application Data continuation-in-part of application No. PCT/JP2013/072140, filed on Aug. 20, 2013.

(51) Int. Cl.
  *C25D 5/50* (2006.01)
  *C23F 17/00* (2006.01)
  *H01M 10/05* (2010.01)

(52) U.S. Cl.
  CPC .......... *H01M 2/0285* (2013.01); *H01M 10/05* (2013.01); *Y10T 428/12438* (2015.01)

(56) References Cited

FOREIGN PATENT DOCUMENTS

| | | |
|---|---|---|
| JP | 2002-208382 A | 7/2002 |
| JP | 2005-085479 A | 3/2005 |
| JP | 2008-041527 A | 2/2008 |
| WO | WO2010/113502 A1 | 10/2010 |
| WO | WO2010/143374 A1 | 12/2010 |

OTHER PUBLICATIONS

Korean Office Action dated Mar. 4, 2020 in KR Application No. 10-2015-7002705.

* cited by examiner

SURFACE-TREATED STEEL SHEET FOR BATTERY CONTAINERS, BATTERY CONTAINER, AND BATTERY

CROSS-REFERENCE TO RELATED APPLICATIONS

This application is a Divisional of co-pending application Ser. No. 14/627,902 filed Feb. 20, 2015, which is a Continuation-in-Part of International Application No. PCT/JP2013/072140 filed on Aug. 20, 2013, for which priority is claimed under 35 U.S.C. § 120; and this application claims priority of Application No. 2012-188513 filed in Japan on Aug. 29, 2012 under 35 U.S.C. § 119, the entire contents of all of which are hereby incorporated by reference.

BACKGROUND OF THE INVENTION

1. Technical Field of the Invention

The present invention relates to a surface-treated steel sheet for battery containers, a battery container using the surface-treated steel sheet for battery containers, and a battery using the battery container.

2. Description of the Related Art

In recent years, lithium-ion batteries and other secondary batteries are widely used as operating power sources for the use in portable electronic devices, such as video cameras, electronic diaries and notebook-size personal computers. Such batteries are required to have a reduced size, light weight and large capacity in accordance with the enhanced performance of the devices in which the batteries are to be equipped. Batteries are configured such that battery containers are filled with electric power generating elements, such as positive electrode active substances and negative electrode active substances. Therefore, the battery containers are required to have enhanced properties as the important constitutional elements of batteries. To this end, battery containers may be formed into a desired shape for the use, through drawing, ironing, or DI or DTR forming.

For example, Patent Document 1 (Japanese Patent Application Publication No. 1999-204146) discloses, as such battery containers, a battery container for a battery that uses a nonaqueous electrolytic solution. This battery container is based on an iron base material and is formed with a nickel plating layer on the inner surface of the battery container.

SUMMARY OF THE INVENTION

However, the battery container disclosed in the above Patent Document 1 has a problem to be solved that, when the thickness of the nickel plating layer is thin, the corrosion resistance given by nickel may deteriorate to dissolve iron into the nonaqueous electrolytic solution so that the leakage of the solution occurs due to the effect of pitting corrosion caused by the dissolution of iron. Accordingly, the thickness of the nickel plating layer may have to be increased to some extent. In this case, however, another problem may arise in that the cost increases and the nickel plating layer drops out of the steel sheet due to the difference in ductility between iron and nickel, or the like. Furthermore, even if the thickness of the nickel plating layer is increased, nickel itself may dissolve into the nonaqueous electrolytic solution depending on the type of the nonaqueous electrolytic solution to be used, thereby to deteriorate the battery characteristics. This may also be problematic.

An object of the present invention is to provide a surface-treated steel sheet for battery containers which is able to suppress the dissolution of iron and nickel into the nonaqueous electrolytic solution when used for a battery container of a battery that uses a nonaqueous electrolytic solution, and which is also able to effectively prevent the occurrence of pitting corrosion and leakage of the solution and deterioration in the battery characteristics. Another object of the present invention is to provide a battery container and a battery which are obtained using such a surface-treated steel sheet for battery containers.

As a result of intensive studies to achieve the above objects, the present inventors have found that the above objects can be achieved by performing thermal diffusion treatment after forming a nickel plating layer on a steel sheet, thereby to form an iron-nickel diffusion layer that has an outermost layer of which the molar ratio of Ni/Fe is 7.5 or less and that has a thickness of 0.6 μm or more. The inventors have thus accomplished the present invention.

That is, according to an aspect of the present invention, there is provided a surface-treated steel sheet for battery containers. The surface-treated steel sheet is used to form a battery container for a battery. The battery uses a nonaqueous electrolytic solution as an electrolytic solution. The surface-treated steel sheet is characterized by the features as below. The surface-treated steel sheet comprises a base material made of steel and an iron-nickel diffusion layer formed by performing thermal diffusion treatment after forming a nickel plating layer at least on a surface of the base material to be located at the inner surface side of the battery container. The iron-nickel diffusion layer has an outermost layer of which a ratio of Ni and Fe is 7.5 or less as a molar ratio of Ni/Fe. The iron-nickel diffusion layer has a thickness of 0.6 μm or more.

It is preferred that the surface-treated steel sheet for battery containers according to the present invention is configured such that the ratio of Ni/Fe of the iron-nickel diffusion layer is within a range of 6.13 to 7.33.

It is preferred that the surface-treated steel sheet for battery containers according to the present invention is configured such that the ratio of Ni/Fe of the iron-nickel diffusion layer is within a range of 0.19 to 0.36.

It is preferred that the surface-treated steel sheet for battery containers according to the present invention is configured such that the nickel plating layer before performing the thermal diffusion treatment has a thickness of 1.0 μm or less.

According to another aspect of the present invention, there is provided a battery container for a battery, the battery using a nonaqueous electrolytic solution as an electrolytic solution, comprising: a container body having a base material made of steel and an iron-nickel diffusion layer formed by performing thermal diffusion treatment after forming a nickel plating layer at least on a surface of the base material to be located at an inner surface side of the battery container, wherein the iron-nickel diffusion layer has an outermost layer of which a ratio of Ni and Fe is 7.5 or less as a molar ratio of Ni/Fe, and the iron-nickel diffusion layer has a thickness of 0.6 μm or more.

According to a further aspect of the present invention, there is provided a battery comprising: a container body having a base material made of steel and an iron-nickel diffusion layer formed by performing thermal diffusion treatment after forming a nickel plating layer at least on a surface of the base material to be located at an inner surface side of the battery container; and battery elements which are placed in the container body and includes a nonaqueous electrolytic solution, wherein the iron-nickel diffusion layer has an outermost layer of which a ratio of Ni and Fe is 7.5 or less as a molar ratio of Ni/Fe, and the iron-nickel diffusion layer has a thickness of 0.6 µm or more.

According to a further aspect of the present invention, there is provided a method of manufacturing a surface-treated steel sheet for battery containers, the surface-treated steel sheet being used to form a battery container for a battery, the battery using a nonaqueous electrolytic solution as an electrolytic solution, comprising: forming a nickel plating layer at least on a surface of the base material made of steel to be located at an inner surface side of the battery container, and forming a iron-nickel diffusion layer by performing thermal diffusion treatment after forming the nickel plating layer, wherein by performing thermal diffusion treatment, the iron-nickel diffusion layer having an outermost layer of which a ratio of Ni and Fe is 7.5 or less as a molar ratio of Ni/Fe, and the iron-nickel diffusion layer has a thickness of 0.6 µm or more, is formed on the base material.

It is preferred that the method of manufacturing the surface-treated steel sheet according to the present invention is configured such that the iron-nickel diffusion layer of which the ratio of Ni/Fe is within a range of 6.13 to 7.33 is formed.

It is preferred that the method of manufacturing the surface-treated steel sheet according to the present invention is configured such that the iron-nickel diffusion layer of which the ratio of Ni/Fe is within a range of 0.19 to 0.36 is formed.

It is preferred that the method of manufacturing the surface-treated steel sheet according to the present invention is configured such that the nickel plating layer having a thickness of 1.0 µm or less is formed.

According to the present invention, there can be provided a surface-treated steel sheet for battery containers which is able to suppress the dissolution of iron and nickel into the nonaqueous electrolytic solution when used for a battery container of a battery that uses a nonaqueous electrolytic solution, and which is thereby able to effectively prevent the occurrence of pitting corrosion and leakage of the solution and deterioration in the battery characteristics. There can also be provided a battery container and a battery which are obtained using the surface-treated steel sheet for battery containers.

DESCRIPTION OF THE PREFERRED EMBODIMENT

Figure 1:
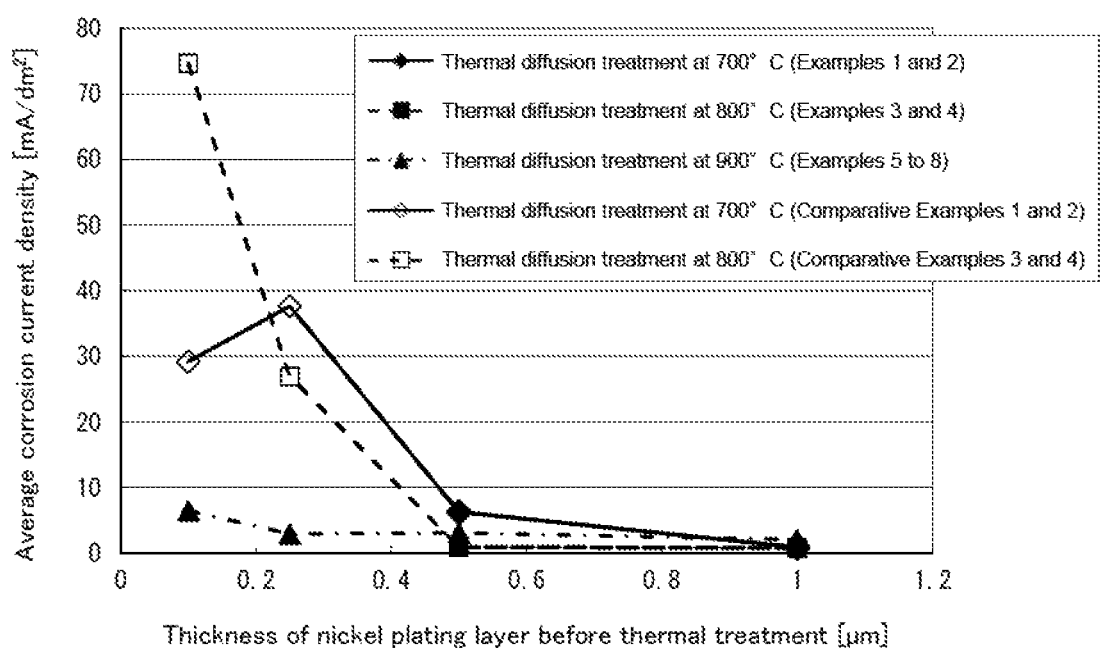
FIG. 1 is a graph which illustrates results of measurement of average corrosion current density at the inner surface side of the can-body central portion of battery containers when the battery containers are made using the surface-treated steel sheets according to examples and comparative examples of the present invention.

The surface-treated steel sheet for battery containers according to the present invention will hereinafter be described.

The surface-treated steel sheet for battery containers according to the present invention is used to form a battery container for a battery that uses a nonaqueous electrolytic solution as an electrolytic solution. The surface-treated steel sheet is characterized by the features as below. The surface-treated steel sheet comprises an iron-nickel diffusion layer formed by performing thermal diffusion treatment after forming a nickel plating layer at least on a surface of a steel sheet to be located at the inner surface side of the battery container. The iron-nickel diffusion layer has an outermost layer of which a ratio of Ni and Fe is 7.5 or less as a molar ratio of Ni/Fe. The iron-nickel diffusion layer has a thickness of 0.6 µm or more.

<Steel Sheet>

The steel sheet to be a base material for the surface-treated steel sheet for battery containers according to the present invention is not particularly limited as long as it has excellent workability in drawing process, in drawing and ironing process, and/or in drawing-thin-redrawing (DTR) process. For example, there can be used a steel sheet of low-carbon aluminum-killed steel (carbon amount of 0.01 to 0.15 wt %) or extra-low-carbon steel of carbon amount of 0.003 wt % or less.

In the present invention, a hot-rolled plate of the above steel is washed using acid to remove scale (oxide film) on the surface, and thereafter cold-rolled, followed by electrolytic cleaning of rolling oil, thereby to be used as the base sheet. Annealing and temper rolling may be performed after the above electrolytic cleaning. The annealing in this case may be any of continuous annealing and batch-type annealing, but is not particularly limited thereto.

<Iron-Nickel Diffusion Layer>

The surface-treated steel sheet for battery containers according to the present invention comprises an iron-nickel diffusion layer on the steel sheet. In the present invention, the iron-nickel diffusion layer is a layer that is formed through: forming a nickel plating layer on the steel sheet; and then performing thermal diffusion treatment for the steel sheet formed with the nickel plating layer thereby to thermally diffuse iron that constitutes the steel sheet and nickel that constitutes the nickel plating layer. The iron-nickel diffusion layer has an outermost layer of which the ratio of Ni and Fe is 7.5 or less as the molar ratio of Ni/Fe. The iron-nickel diffusion layer has a thickness of 0.6 µm or more.

In the present invention, the iron-nickel diffusion layer is designed to be formed by thermal diffusion and to have the molar ratio of Ni/Fe at the outermost layer and the thickness within the above ranges. Therefore, when the surface-treated steel sheet is used for a battery container for a battery that uses a nonaqueous electrolytic solution, the above design allows to prevent iron and nickel from dissolving into the nonaqueous electrolytic solution. It is thereby possible to obtain a surface-treated steel sheet for battery containers which is able to effectively prevent the occurrence of pitting corrosion and leakage of the solution and deterioration in the battery characteristics.

In the surface-treated steel sheet for battery containers according to the present invention, the molar ratio of Ni/Fe at the outermost layer of the iron-nickel diffusion layer is 7.5 or less, and may preferably be 7.0 or less and more preferably 6.5 or less. If the molar ratio of Ni/Fe is unduly high, the ratio of nickel in the iron-nickel diffusion layer increases so that the nickel negatively affects the weldability with other components such as electrodes and can ends. In particular, when the surface-treated steel sheet is used for a battery container for a battery that uses a nonaqueous electrolytic solution, the nickel may dissolve into the nonaqueous electrolytic solution that constitutes the battery. This may possibly result in the deterioration in the battery characteristics. On the other hand, the lower limit of the molar ratio of Ni/Fe may ordinarily be 0.15 or more, and preferably 0.30 or more, from an aspect that the nickel may have to be moderately contained in the iron-nickel diffusion layer so as to suppress the dissolution of iron into the nonaqueous electrolytic solution.

Here, the molar ratio of Ni/Fe in the present invention can be measured using the method below, for example. That is, a scanning-type Auger electron spectroscopic analyzer (AES) is first used to perform measurement for the surface of the iron-nickel diffusion layer to calculate the atomic percentages (at %) of Ni and Fe at the surface of the iron-nickel diffusion layer. More specifically, the measurement using the scanning-type Auger electron spectroscopic analyzer may be conducted for five locations on the surface of the iron-nickel diffusion layer, and the obtained results can be averaged to calculate the molar ratio of Ni/Fe (at % of Ni/at % of Fe). In the present invention, the atomic percentages of Ni and Fe may be measured on the assumption that, among peaks obtained by the measurement using the scanning-type Auger electron spectroscopic analyzer, a peak or peaks within a range of 820 to 850 eV represent those of Ni while a peak or peaks within a range of 570 to 600 eV represent those of Fe, and the total of Ni and Fe is 100 at %.

The surface-treated steel sheet for battery containers according to the present invention has a feature that the thickness of the iron-nickel diffusion layer is 0.6 μm or more, and may preferably be 0.8 μm or more, in addition to the feature that the molar ratio of Ni/Fe at the outermost layer of the iron-nickel diffusion layer is within the above range. If the thickness of the iron-nickel diffusion layer is unduly thin, there cannot be sufficiently obtained the effect of suppressing the dissolution of iron and nickel into the nonaqueous electrolytic solution. In the present invention, according to the feature that the thickness of the iron-nickel diffusion layer is within the above range in addition to the feature that the molar ratio of Ni/Fe at the outermost layer of the iron-nickel diffusion layer is within the above range, the surface-treated steel sheet can suppress the dissolution of iron and nickel into the nonaqueous electrolytic solution when used for a battery container, and can also effectively prevent the occurrence of pitting corrosion and leakage of the solution and deterioration in the battery characteristics.

The thickness of the iron-nickel diffusion layer can be measured using the method below, for example. That is, a high-frequency glow discharge optical emission spectroscopic analyzer may be used to measure the transition of Ni intensity in the depth direction of the iron-nickel diffusion layer to detect the depth at which no nickel exists, from the start of measurement, and the thickness of the iron-nickel diffusion layer can thus be obtained. In the present invention, when the Ni intensity is measured for the surface-treated steel sheet for battery containers, the maximum value of the Ni intensity may be used as a reference, and the region in which the Ni intensity is one-tenth or more of the maximum value can be determined as a region in which nickel exists. Accordingly, in the present invention, while the Ni intensity is measured in the depth direction of the surface-treated steel sheet for battery containers, the point of time at which the measurement was started is used as a starting time, and the measurement time from the starting time to a point of time at which the Ni intensity becomes less than one-tenth of the maximum value of the Ni intensity may be calculated. The thickness of the iron-nickel diffusion layer can be obtained on the basis of the calculated measurement time.

Thus, the surface-treated steel sheet for battery containers according to the present invention is formed with the iron-nickel diffusion layer as described above. Such an iron-nickel diffusion layer can be formed using the method below, for example.

The nickel plating layer for forming the iron-nickel diffusion layer can be formed on the steel sheet using a nickel plating bath, for example. As the nickel plating bath, there can be used a plating bath which is ordinarily used in nickel plating, such as Watts bath, sulfamate bath, fluoroborate bath, and chloride bath. For example, the nickel plating layer can be formed using Watts bath having a bath composition of 200 to 350 g/L of nickel sulfate, 20 to 60 g/L of nickel chloride and 10 to 50 g/L of boric acid under conditions of pH of 3 to 4.8, bath temperature of 40° C. to 70° C. and current density of 10 to 40 A/dm$^2$ (preferably 20 to 30 A/dm$^2$). The nickel plating layer may be formed at least on the surface of the steel sheet to be located at the inner surface side of the battery container.

In the present invention, after the nickel plating layer is formed on the steel sheet under the conditions as the above, thermal diffusion treatment is performed for the steel sheet formed with the nickel plating layer to form an iron-nickel diffusion layer.

The thermal diffusion treatment may be performed by any of continuous annealing method or batch-type annealing method, and is not particularly limited thereto. Conditions for the thermal diffusion treatment may be appropriately selected depending on the thickness and depositing amount of the nickel plating layer. If, for example, the continuous annealing is employed, it is preferred that the thermal treatment temperature is within a range of 700° C. to 800° C. and the thermal treatment time is within a range of 10 to 300 seconds, while if the batch-type annealing is employed, it is preferred that the thermal treatment temperature is within a range of 450° C. to 600° C., the thermal treatment time is within a range of 1 to 10 hours, and the thermal treatment atmosphere is a non-oxidizing atmosphere or a reducing protective gas atmosphere. When the thermal treatment atmosphere is the reducing protective gas atmosphere, it is preferred to use protective gas which comprises 75% hydrogen and 25% nitrogen with high heat conductivity and which is generated by ammonia crack method, referred to as hydrogen enriched annealing.

When the above-described thermal diffusion treatment is performed, the thickness of the nickel plating layer before performing the thermal diffusion treatment may preferably be 1.0 μm or less (8.9 g/m$^2$ or less as an amount of nickel). The thickness of the nickel plating layer being within the above range allows the iron-nickel diffusion layer to be formed on the steel sheet in a state in which iron thermally diffuses to the outermost surface, when the thermal diffusion treatment is performed under the above-described conditions. That is, there can be obtained a structure (Fe—Ni/Fe) in which an unalloyed nickel layer without diffused iron does not remain at the outermost surface and only the iron-nickel diffusion layer is formed on the steel sheet.

Here, if the thickness of the nickel plating layer before performing the thermal diffusion treatment is unduly thin, i.e., if the thickness of the nickel plating layer before performing the thermal diffusion treatment exceeds 1.0 μm (the amount of nickel exceeds 8.9 g/m$^2$), diffusion of iron into the nickel plating layer may be insufficient even when the thermal diffusion treatment is performed under the above-described conditions, so that an unalloyed nickel layer without diffused iron remains at the outermost surface. This may lead to a problem in that the nickel located at the outermost surface negatively affects the weldability when the battery container is welded with other components such as electrodes and can ends and a problem in that, when the battery container is actually used, the nickel located at the outermost surface dissolves into the nonaqueous electrolytic solution thereby to deteriorate the battery characteristics.

In order to thermally diffuse iron to the surface of such a nickel plating layer having a thickness of more than 1.0 μm (the amount of nickel of more than 8.9 g/m$^2$) so that the nickel plating layer does not remain at the outermost surface of the surface-treated steel sheet to be obtained, conditions for the thermal diffusion may have to be those of a relatively high temperature and a relatively long period of time (e.g., a higher temperature and a longer period of time than those of the above-described thermal diffusion conditions). In this case, however, excessive heat is applied to the steel sheet, which may lead to problems as below. First, when the thermal diffusion treatment is performed using the continuous annealing, the upper limit of the thermal treatment time may be restricted because the continuous annealing is carried out in a state of being incorporated into the manufacturing line. Accordingly, the continuous annealing may have to be carried out at a high temperature so as to thermally diffuse iron to the surface of the nickel plating layer. This may lead to a problem in that the mechanical characteristics of the steel sheet deteriorate in particular at the parts of the steel sheet which have been exposed to the high temperature. On the other hand, when the thermal diffusion treatment is performed using the batch-type annealing, the thermal treatment time can be prolonged unlike the above-described continuous annealing, and the thermal treatment temperature can thus be a relatively low temperature so as to prevent the deterioration in the mechanical characteristics of the steel sheet. However, since the batch-type annealing may ordinarily employ a method in which the steel sheet is heated in a coiled state in a batch-type annealing furnace, parts of the coiled steel sheet will adhere to one another as a result of the steel sheet having been heated during a long period of time, which may be problematic.

In contrast, according to the surface-treated steel sheet for battery containers of the present invention, the thickness of the nickel plating layer before performing the thermal diffusion treatment is within the above range thereby to allow the thermal treatment to be carried out under the appropriate conditions even when the iron is thermally diffused to the surface of the nickel plating layer. It is therefore possible to effectively prevent the deterioration in the mechanical characteristics of the steel sheet and the adhesion of parts of the steel sheet to one another.

The lower limit of the thickness of the nickel plating layer before performing the thermal diffusion treatment is not particularly limited, but may ordinarily be 0.1 μm or more, and preferably 0.2 μm or more.

<Battery Container>

The battery container according to the present invention, which may be used to form a battery that uses a nonaqueous electrolytic solution, is obtained by forming the above-described surface-treated steel sheet for battery containers according to the present invention so that the iron-nickel diffusion layer is located at the inner surface side of the battery container. The molar ratio of Ni/Fe at the outermost surface and the thickness of the iron-nickel diffusion layer are within the above ranges. Specifically, the battery container according to the present invention can be obtained by forming the above-described surface-treated steel sheet for battery containers according to the present invention into a battery container shape through drawing, ironing, or DI or DTR forming.

Since the battery container according to the present invention is formed using the above-described surface-treated steel sheet for battery containers according to the present invention, it is possible to suppress the dissolution of iron and nickel into the nonaqueous electrolytic solution and effectively prevent the occurrence of pitting corrosion and leakage of the solution and deterioration in the battery characteristics.

Thus, the surface-treated steel sheet for battery containers according to the present invention may preferably be used for a battery container for a lithium-ion battery or the like which uses a nonaqueous electrolytic solution as the electrolytic solution, for example. A lithium-ion battery using such a nonaqueous electrolytic solution can be manufactured in a manner as below, for example, using the surface-treated steel sheet for battery containers according to the present invention. First, a negative electrode is prepared by applying a negative electrode mixture to a metal foil and a positive electrode is also prepared by applying a positive electrode mixture to a metal foil. The negative electrode mixture contains an active material that is capable of doping and undoping of lithium. The positive electrode mixture contains an active material that is represented by $Li_xMO_2$ (M is a metal atom). The prepared negative electrode and positive electrode are stacked via a separator to form an electrode current collector. The electrode current collector thus formed is then housed in a battery container, which is formed using the surface-treated steel sheet for battery containers according to the present invention, in a state of being impregnated with a nonaqueous electrolytic solution. The negative electrode is electrically connected with the battery container, which is thereafter hermetically sealed. In this manner, the lithium-ion battery using a nonaqueous electrolytic solution is manufactured using the surface-treated steel sheet for battery containers according to the present invention.

Figure 3:
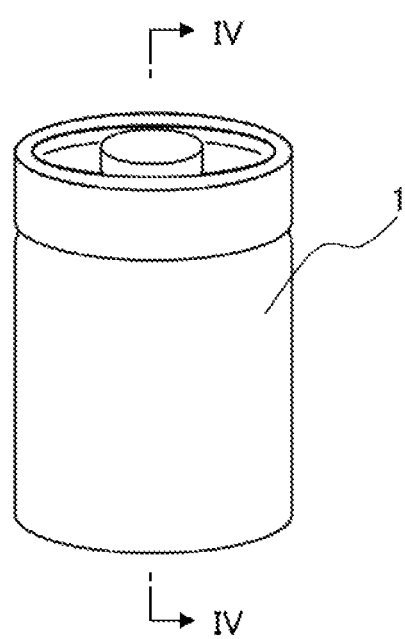
FIG. 3 is a perspective view of an embodiment of the lithium-ion battery using the battery container which is made of the surface-treated steel sheet according to the present invention.
Figure 4:
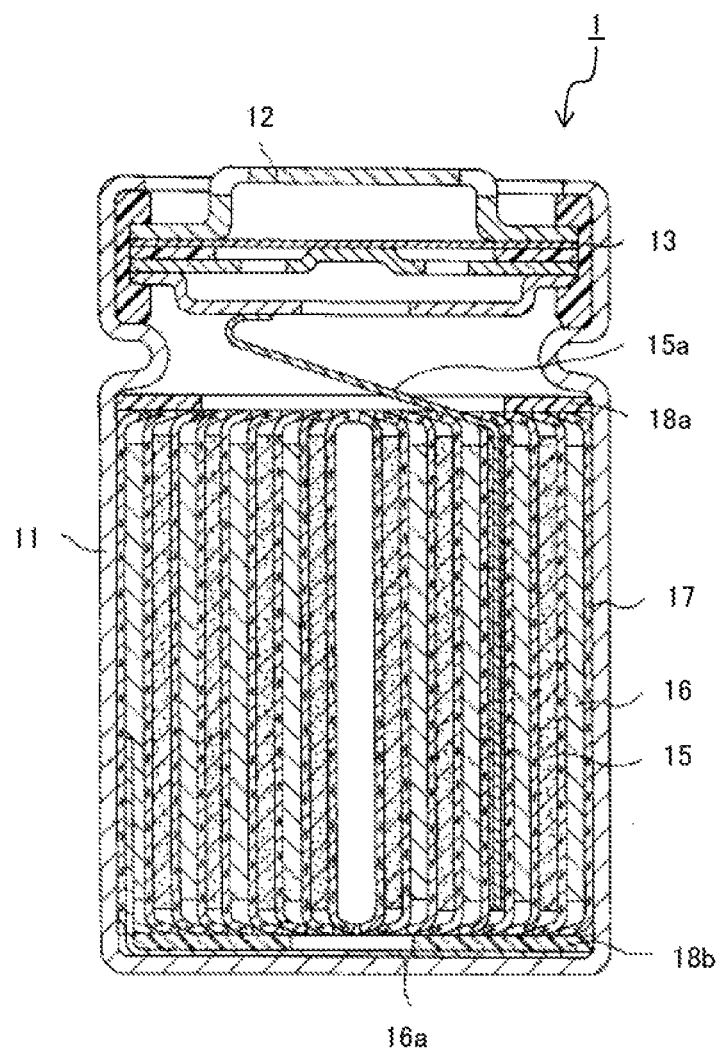
FIG. 4 is a sectional view along the line IV-IV in FIG. 3.

Incidentally, an embodiment of the lithium-ion battery 1 using the battery container (a battery can 11) which is made of the surface-treated steel sheet according to the present invention will be described. FIG. 3 is a perspective view of an embodiment of a lithium-ion battery 1. FIG. 4 is a sectional view of a lithium-ion battery 1. A battery can 11 accommodates battery elements (electric power generating elements) including a nonaqueous electrolytic solution. The battery elements consists of a positive electrode plate 15, a negative electrode plate 16, and a separator 17 interposed between the positive and negative electrode plates, the electrode plate group being spirally rolled up a plurality of turns. The opening end of the battery can 11 is sealed by a sealing plate 12, which is equipped with a safety valve and also serves as a positive electrode terminal. The battery can 11 is electrically insulated from the sealing plate 12 by an insulating packing 13. A positive electrode lead 15a, which is attached to the positive electrode plate 15, is electrically connected to the sealing plate 12. A negative electrode lead 16a, which is attached to the negative electrode plate 16, is electrically connected to the inner face of the bottom of the battery can 11. Insulating rings 18a and 18b are fitted to the upper and lower parts of the electrode plate group, respectively.

The nonaqueous electrolytic solution used in such a lithium-ion battery may be an organic electrolytic solution obtained by dissolving a supporting electrolyte into an organic solvent. Lithium salt may be used as the supporting electrolyte. Examples of the lithium salt include, but are not particularly restricted to, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$.

The organic solvent used in the nonaqueous electrolytic solution of the lithium-ion battery is not particularly limited as long as it can dissolve the supporting electrolyte. Examples thereof include: carbonates such as dimethyl carbonate (DMC), ethylene carbonate (EC), diethyl carbonate (DEC), propylene carbonate (PC), butylene carbonate (BC), methyl ethyl carbonate (MEC) and vinylene carbonate (VC); esters such as γ-butyrolactone and methyl formate; ethers such as 1,2-dimethoxyethane (DME) and tetrahydrofuran; and sulfur-containing compounds such as sulfolane and dimethyl sulfoxide. These may be solely used, or two or more thereof may be used in combination.

Since the battery container according to the present invention is formed using the above-described surface-treated steel sheet for battery containers according to the present invention, even when such a nonaqueous electrolytic solution is used as the electrolytic solution of the battery, the dissolution of iron and nickel from the inner surface side of the battery container to the nonaqueous electrolytic solution can be effectively suppressed independent of the type of the organic solvent or solvents and the combination and mixing ratio of the organic solvents, and the type and content of the lithium salt or salts.

EXAMPLES

The present invention will hereinafter be described more specifically with reference to examples, but the present invention is not limited to these examples.

The evaluation method for each characteristic is as follows.

<Measurement of Thickness of Iron-Nickel Diffusion Layer>

A high-frequency glow discharge optical emission spectroscopic analyzer (available from Rigaku Corporation, model number: System 3860T) was used to measure the transition of Ni intensity in the depth direction from the surface of the surface-treated steel sheet. The point of time at which the measurement was started was used as a starting time, and the measurement time from the starting time to a point of time at which the Ni intensity became less than one-tenth of the maximum value of the Ni intensity was calculated. The thickness of the iron-nickel diffusion layer was obtained on the basis of the calculated measurement time. Measurement of the thickness of the iron-nickel diffusion layer was performed only for Examples 1-8 and Comparative Examples 1-4 of the examples and the comparative examples to be described later.

<Measurement of Molar Ratio of Ni/Fe at Outermost Surface>

A scanning-type Auger electron spectroscopic analyzer (available from JEOL Ltd., model number: JAMP-9500F) was first used to perform measurement for five locations on the surface of the surface-treated steel sheet, and the atomic percentages (at %) of Ni and Fe at the five locations were calculated. The calculated results at the five locations were then used to calculate average values of the atomic percentages of Ni and Fe, and the molar ratio of Ni/Fe (at % of Ni/at % of Fe) was obtained on the basis of the calculated average values. Measurement of the molar ratio of Ni/Fe at the outermost surface was performed for all of the examples and the comparative examples to be described later.

<Evaluation of Spot Weldability>

Figure 2:
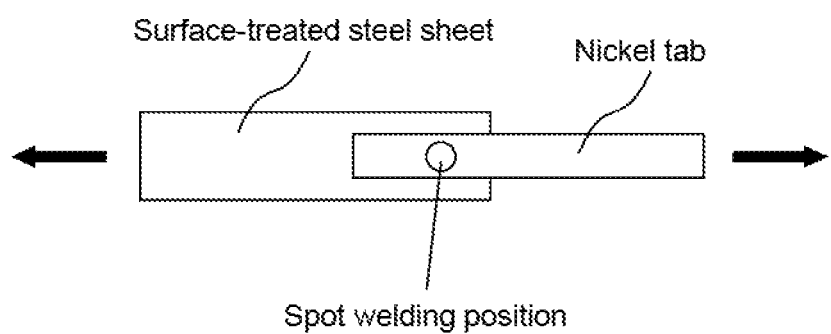
FIG. 2 is a view for explaining a method of evaluating the spot weldability of the surface-treated steel sheets according to examples and comparative examples of the present invention.

As illustrated in FIG. 2, the surface-treated steel sheet and a nickel tab were used to perform evaluation of spot weldability of the surface-treated steel sheet. Specifically, a nickel tab manufactured by rolling a pure nickel plate was prepared (thickness of 0.1 mm, width of 5 mm and length of 40 mm), and the prepared nickel tab was embossed at 25 spots within an area (around the spot welding position illustrated in FIG. 2) separated 10 mm from an end of the prepared nickel tab. The surface-treated steel sheet was worked into a width of 10 mm and a length of 40 mm, and the surface-treated steel sheet and the nickel tab were then welded at the welding position under the conditions of a load: 30 N, a welding time: 0.01 seconds, a welding current: 2.5 kA, and a welding electrode: nichrome copper electrode (electrode diameter: φ3 mm). Thereafter, a tensile tester (available from ORIENTEC Co., LTD, model number: RIC-1350A) was used to concurrently pull the surface-treated steel sheet and the nickel tab leftward and rightward, respectively, as illustrated by arrows in FIG. 2, thereby to measure a maximum point load at the welding part between the surface-treated steel sheet and the nickel tab. Measurement results were evaluated in accordance with the criteria below. Results are listed in Table 2.

A: Maximum point load at welding part is 14.5 kgf or more.

B: Maximum point load at welding part is 13.0 kgf or more and less than 14.5 kgf.

C: Maximum point load at welding part is 12.3 kgf or more and less than 13.0 kgf.

D: Maximum point load at welding part is less than 12.3 kgf.

In the evaluation results of the spot weldability, when the maximum point load at the welding part was less than 12.3 kgf, i.e., when the evaluation result was D, the surface-treated steel sheet was determined to have poor weldability with other components such as electrodes and can ends, for the use as battery containers. Evaluation of the spot weldability was performed only for Examples 1-4, 7 and 8 and Comparative Examples 5 and 6 of the examples and the comparative examples to be described later.

<Measurement of Average Corrosion Current Density>

A central part of a can-body was cut out from a battery container obtained by forming the surface-treated steel sheet, and was immersed into a preliminarily prepared nonaqueous electrolytic solution. At that time, the nonaqueous electrolytic solution used was an electrolytic solution obtained by adding $LiPF_6$ to a nonaqueous solvent of a mixture of ethylene carbonate (EC) and 1,2-dimethoxyethane (DME) with a volume ratio of 1:1 so that the concentration would be 1 M. Subsequently, with regard to the inner surface side of the can-body central part of the battery container immersed in the nonaqueous electrolytic solution, controlled-potential electrolysis was performed under the conditions of a voltage: 0.5 V (reference electrode: Ag/AgCl) and a discharge time: 1 hour to measure the current density of the battery container during the controlled-potential electrolysis, and the current density was averaged for the 1 hour of the measurement to calculate an average corrosion current density. Measurement of the average corrosion current density was performed only for Examples 1-8 and Comparative Examples 1-4 of the examples and the comparative examples to be described later.

The average corrosion current density obtained in such a manner refers to a value that represents a current density of a current flowing in the surface layer at the inner surface side of the battery container when the controlled-potential electrolysis is performed through immersion into the nonaqueous electrolytic solution. This value can be used to determine whether an electrode reaction occurs at the inner surface side of the battery container. Specifically, when the average corrosion current density exceeds 20 mA/dm$^2$, it can be determined that the electrode reaction occurs at the inner surface side of the battery container so that iron and nickel dissolve into the nonaqueous electrolytic solution from the inner surface side of the battery container. In the present examples, therefore, it was determined that the dissolution of iron and nickel into the nonaqueous electrolytic solution from the inner surface side of the battery container was effectively suppressed when the average corrosion current density was not more than 20 mA/dm$^2$.

Example 1

As a base substance, there was prepared a steel sheet obtained by annealing a cold-rolled sheet (thickness of 0.25 mm) of low-carbon aluminum-killed steel having a chemical composition as below:

C: 0.045 wt %, Mn: 0.23 wt %, Si: 0.02 wt %, P: 0.012 wt %, S: 0.009 wt %, Al: 0.063 wt %, and the balance: Fe and unavoidable impurities.

After performing alkaline electrolytic cleaning and acid wash of immersion into sulfuric acid for the prepared steel sheet, nickel plating was performed to form a nickel plating layer of a thickness of 0.5 μm. The nickel plating was performed under the conditions below:

bath composition: 300 g/L of nickel sulfate, 45 g/L of nickel chloride, 30 g/L of boric acid, and 0.4 ml/L of pitting inhibitor (sodium lauryl sulfate);

pH: 3 to 4.8;

bath temperature: 60° C.; and current density: 25 A/dm$^2$.

Subsequently, for the steel sheet formed with the nickel plating layer, continuous annealing was used to perform thermal diffusion treatment under the conditions of a temperature of 700° C. and a reducing atmosphere thereby to form an iron-nickel diffusion layer, and a surface-treated steel sheet was thus obtained.

Thereafter, for the surface-treated steel sheet obtained in such a manner, measurement of the thickness of the iron-nickel diffusion layer, measurement of the molar ratio of Ni/Fe at the outermost layer and evaluation of the spot weldability were performed in accordance with the above-described methods. Results are listed in Tables 1 and 2.

The surface-treated steel sheet obtained in the above was then formed into a battery container having a cylindrical shape of an outer diameter of 13.8 mm and a height of 49.3 mm through a multistage drawing process so that the iron-nickel diffusion layer would be located at the inner surface side of the battery container, and the battery container was thus manufactured.

Thereafter, for the inner surface side of the can-body central part of the battery container obtained in such a manner, measurement of the average corrosion current density was performed in accordance with the above-described method. Results are listed in Table 1 and FIG. 1.

FIG. 1 is a graph illustrating a relationship between the thickness of the nickel plating layer before the thermal treatment and the average corrosion current density. FIG. 1 indicates line plots for the results of Examples 2 to 8 and Comparative Examples 1 to 4 to be described later in addition to the above-described Example 1, and different types of the line plots are used for different temperature conditions under which the thermal diffusion treatment was performed. Specifically, in FIG. 1, solid lines are used for cases in which the temperature condition of the thermal diffusion treatment is 700° C., dashed lines are used for cases of 800° C., and dashed-dotted lines are used for cases of 900° C. Moreover, filled markers are plotted on the graph of FIG. 1 for the results of Examples 1 to 8, while outline markers are plotted for the results of Comparative Examples 1 to 4.

Examples 2 to 4

Surface-treated steel sheets and battery containers were made in a similar manner to that in Example 1 except for forming the nickel plating layers to have thicknesses before the thermal treatment as listed in Tables 1 and 2 and changing the temperature for performing the thermal diffusion treatment as listed in Tables 1 and 2, and evaluations were performed in the same manner. Results are listed in Tables 1 and 2 and illustrated in FIG. 1.

Examples 5 and 6

Surface-treated steel sheets and battery containers were made in a similar manner to that in Example 1 except for forming the nickel plating layers to have thicknesses before the thermal treatment as listed in Table 1 and changing the temperature for performing the thermal diffusion treatment as listed in Table 1. Thereafter, for the obtained surface-treated steel sheets and battery containers, measurement of the thickness of the iron-nickel diffusion layer, measurement of the molar ratio of Ni/Fe at the outermost layer and measurement of the average corrosion current density were performed in accordance with the above-described methods. Results are listed in Table 1 and illustrated in FIG. 1.

Examples 7 and 8

Surface-treated steel sheets and battery containers were made in a similar manner to that in Example 1 except for forming the nickel plating layers to have thicknesses before the thermal treatment as listed in Tables 1 and 2 and changing the temperature for performing the thermal diffusion treatment as listed in Tables 1 and 2, and evaluations were performed in the same manner. Results are listed in Tables 1 and 2 and illustrated in FIG. 1.

Comparative Examples 1 to 4

Surface-treated steel sheets and battery containers were made in a similar manner to that in Example 1 except for forming the nickel plating layers to have thicknesses before the thermal treatment as listed in Table 1 and changing the temperature for performing the thermal diffusion treatment as listed in Table 1. Thereafter, for the obtained surface-treated steel sheets and battery containers, measurement of the thickness of the iron-nickel diffusion layer, measurement of the molar ratio of Ni/Fe at the outermost layer and measurement of the average corrosion current density were performed in accordance with the above-described methods. Results are listed in Table 1 and illustrated in FIG. 1.

Comparative Examples 5 and 6

Surface-treated steel sheets and battery containers were made in a similar manner to that in Example 1 except for forming the nickel plating layers to have thicknesses as listed in Table 2 and then not carrying out the thermal diffusion treatment (the iron-nickel diffusion layer was not formed). Thereafter, for the obtained surface-treated steel sheets and battery containers, measurement of the molar ratio of Ni/Fe at the outermost layer and evaluation of the spot weldability were performed in accordance with the above-described methods. Results are listed in Table 2. In Comparative Examples 5 and 6, the measurement results of the molar ratio of Ni/Fe at the outermost layer are large values around 9. It has therefore been confirmed that the iron of the steel sheet does not diffuse into the nickel plating layer and almost all areas of the outermost layer are formed of nickel.

values are not more than 20 mA/dm$^2$, so the dissolution of iron and nickel into the nonaqueous electrolytic solution from the inner surface side of the battery container is effectively suppressed. With regard to Examples 1 to 4, 7 and 8 for which evaluation of the spot weldability was performed, evaluation results of the spot weldability are good. The evaluation results thus show that these examples have good weldability.

In contrast, Comparative Examples 1 to 4, in which the thickness of the iron-nickel diffusion layer is less than 0.6 exhibit values of the average corrosion current density all of which are not less than 26.9 mA/dm$^2$. These values exceed 20 mA/dm$^2$, so the results are such that iron and nickel dissolve into the nonaqueous electrolytic solution from the inner surface side of the battery container. With regard to Comparative Examples 5 and 6 for which the thermal diffusion treatment is not carried out and in which the molar ratio of Ni/Fe at the outermost surface exceeds 7.5, evaluation results of the spot weldability are bad. The evaluation results thus show that these comparative examples have poor weldability.

TABLE 1

| | Thickness of nickel plating layer [μm] | Conditions for thermal diffusion treatment | | Thickness of iron-nickel diffusion layer [μm] | Molar ratio of Ni/Fe | Average corrosion current density [mA/dm$^2$] |
|---|---|---|---|---|---|---|
| | | Temperature [° C.] | Time [min] | | | |
| Example 1 | 0.5 | 700 | 1 | 0.86 | 7.00 | 6.3 |
| Example 2 | 1.0 | 700 | 1 | 1.60 | 7.33 | 0.9 |
| Example 3 | 0.5 | 800 | 1 | 0.88 | 2.98 | 0.9 |
| Example 4 | 1.0 | 800 | 1 | 1.74 | 6.13 | 0.8 |
| Example 5 | 0.1 | 900 | 1 | 0.60 | 0.19 | 6.5 |
| Example 6 | 0.25 | 900 | 1 | 0.83 | 0.36 | 2.9 |
| Example 7 | 0.5 | 900 | 1 | 1.12 | 1.92 | 3.1 |
| Example 8 | 1.0 | 900 | 1 | 1.30 | 4.98 | 2.1 |
| Comparative Example 1 | 0.1 | 700 | 1 | 0.32 | 1.01 | 29.2 |
| Comparative Example 2 | 0.25 | 700 | 1 | 0.55 | 5.90 | 37.7 |
| Comparative Example 3 | 0.1 | 800 | 1 | 0.36 | 0.47 | 74.7 |
| Comparative Example 4 | 0.25 | 800 | 1 | 0.57 | 1.07 | 26.9 |

TABLE 2

| | Thickness of nickel plating layer [μm] | Conditions for thermal diffusion treatment | | Molar ratio of Ni/Fe | Spot weldability |
|---|---|---|---|---|---|
| | | Temperature [° C.] | Time [min] | | |
| Example 1 | 0.5 | 700 | 1 | 7.00 | C |
| Example 2 | 1 | 700 | 1 | 7.33 | C |
| Example 3 | 0.5 | 800 | 1 | 2.98 | A |
| Example 4 | 1 | 800 | 1 | 6.13 | B |
| Example 7 | 0.5 | 900 | 1 | 1.92 | A |
| Example 8 | 1 | 900 | 1 | 4.98 | B |
| Comparative Example 5 | 0.5 | None | | 9.01 | D |
| Comparative Example 6 | 1 | None | | 9.13 | D |

As listed in Tables 1 and 2 and illustrated in FIG. 1, Examples 1 to 8, in which the molar ratio of Ni/Fe at the outermost layer of the iron-nickel diffusion layer is 7.5 or less and the thickness of the iron-nickel diffusion layer is 0.6 μm or more, exhibit values of the average corrosion current density all of which are not more than 6.5 mA/dm$^2$. These

What is claimed is:

1. A surface-treated steel sheet for battery containers, the surface-treated steel sheet being used to form a battery container for a battery, the battery using a nonaqueous electrolytic solution as an electrolytic solution, comprising:
   a base material made of steel; and
   an iron-nickel diffusion layer formed by performing thermal diffusion treatment after forming a nickel plating layer at least on a surface of the base material to be located at an inner surface side of the battery container, wherein
   the iron-nickel diffusion layer has an outermost layer of which a ratio of Ni and Fe is 7.5 or less as a molar ratio of Ni/Fe obtained by measurement using a scanning-type Auger electron spectroscopic analyzer, and the iron-nickel diffusion layer has a thickness of 0.6 μm or more.

2. The surface-treated steel sheet according to claim 1, wherein the ratio of Ni/Fe of the iron-nickel diffusion layer is within a range of 6.13 to 7.33.

3. The surface-treated steel sheet according to claim 1, wherein the ratio of Ni/Fe of the iron-nickel diffusion layer is within a range of 0.19 to 0.36.

4. The surface-treated steel sheet according to claim 1, wherein the nickel plating layer before performing the thermal diffusion treatment has a thickness of 1.0 μm or less.

5. A battery container for a battery, the battery using a nonaqueous electrolytic solution as an electrolytic solution, comprising:
a container body having a base material made of steel and an iron-nickel diffusion layer formed by performing thermal diffusion treatment after forming a nickel plating layer at least on a surface of the base material to be located at an inner surface side of the battery container, wherein
the iron-nickel diffusion layer has an outermost layer of which a ratio of Ni and Fe is 7.5 or less as a molar ratio of Ni/Fe, and the iron-nickel diffusion layer has a thickness of 0.6 μm or more.

6. A battery comprising:
a container body having a base material made of steel and an iron-nickel diffusion layer formed by performing thermal diffusion treatment after forming a nickel plating layer at least on a surface of the base material to be located at an inner surface side of the battery container; and
battery elements which are placed in the container body and includes a nonaqueous electrolytic solution, wherein
the iron-nickel diffusion layer has an outermost layer of which a ratio of Ni and Fe is 7.5 or less as a molar ratio of Ni/Fe, and the iron-nickel diffusion layer has a thickness of 0.6 μm or more.

7. The surface-treated steel sheet according to claim 1, wherein an amount of nickel in the iron-nickel diffusion layer is 8.9 g/m$^2$ or less.

8. The surface-treated steel sheet according to claim 1, wherein the iron-nickel diffusion layer has a thickness of 0.6 to 1.3 μm.

9. The surface-treated steel sheet according to claim 1, wherein the ratio of Ni/Fe of the iron-nickel diffusion layer is 6.5 or less.

* * * * *